(12) United States Patent
Kato

(10) Patent No.: US 11,782,233 B2
(45) Date of Patent: Oct. 10, 2023

(54) OPTICAL APPARATUS AND IMAGE PICKUP APPARATUS

(71) Applicant: CANON KABUSHIKI KAISHA, Tokyo (JP)

(72) Inventor: Yuichiro Kato, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 238 days.

(21) Appl. No.: 17/005,070

(22) Filed: Aug. 27, 2020

(65) Prior Publication Data
US 2021/0063678 A1    Mar. 4, 2021

(30) Foreign Application Priority Data

Aug. 30, 2019    (JP) .................................. 2019-157545

(51) Int. Cl.
| | |
|---|---|
| *G02B 7/04* | (2021.01) |
| *G02B 27/64* | (2006.01) |
| *G03B 13/32* | (2021.01) |
| *G03B 5/00* | (2021.01) |
| *G03B 17/12* | (2021.01) |
| *G02B 7/02* | (2021.01) |

(52) U.S. Cl.
CPC ............... *G02B 7/04* (2013.01); *G02B 7/021* (2013.01); *G02B 7/023* (2013.01); *G02B 27/646* (2013.01); *G03B 5/00* (2013.01); *G03B 13/32* (2013.01); *G03B 17/12* (2013.01); *G03B 2205/0023* (2013.01)

(58) Field of Classification Search
CPC .......... G02B 7/04; G02B 7/021; G02B 7/023; G03B 13/32; G03B 17/12
See application file for complete search history.

(56) References Cited

U.S. PATENT DOCUMENTS

| | | | |
|---|---|---|---|
| 2016/0178865 A1* | 6/2016 | Ochi ..................... | G03B 11/045 359/825 |
| 2017/0003576 A1* | 1/2017 | Hatakeyama .......... | G03B 17/14 |
| 2019/0285831 A1* | 9/2019 | Okada ..................... | H02N 2/123 |

FOREIGN PATENT DOCUMENTS

| | | | | |
|---|---|---|---|---|
| CN | 101419329 B | * | 4/2010 | ............... G02B 7/04 |
| CN | 102141670 A | * | 8/2011 | ............. G02B 7/023 |
| JP | 2007-25154 A | | 2/2007 | |
| JP | 2011-154306 A | | 8/2011 | |
| JP | 2011-237595 A | | 11/2011 | |
| JP | 2013-3446 A | | 1/2013 | |
| JP | 2016-212329 A | | 12/2016 | |
| JP | 2017-138449 A | | 8/2017 | |
| JP | 2018-5135 A | | 1/2018 | |
| WO | 2013/121832 A1 | | 8/2013 | |

* cited by examiner

*Primary Examiner* — Clayton E. LaBalle
*Assistant Examiner* — Diana Hancock
(74) *Attorney, Agent, or Firm* — CANON U.S.A., Inc. IP Division

(57) ABSTRACT

An optical apparatus including: an optical element; a front fixed barrel; a front cover; a function operation ring, which is arranged between the front fixed barrel and the front cover, and is configured to be rotated to move the optical element; and a fixing screw configured to fix the front fixed barrel and the front cover to each other, in which at least one of the front fixed barrel or the front cover includes a deformation beam portion configured to absorb stress generated by the fixing screw.

28 Claims, 6 Drawing Sheets

FIG. 2

OPTICAL APPARATUS AND IMAGE PICKUP APPARATUS

BACKGROUND OF THE DISCLOSURE

Field of the Disclosure

The aspect of the embodiments relates to an optical apparatus and an image pickup apparatus using the optical apparatus.

Description of the Related Art

In general, there have been known an optical apparatus (interchangeable lens) including so-called an operation ring that enables photographing conditions such as a focus position, magnification, and further an F-number to be changed through a manual rotation by a photographer, and an image pickup apparatus using the optical apparatus. The operation ring is not required to only change photographing conditions but also have higher operability that achieves both functionality that allows rotation to be promptly stopped in an appropriate manner in accordance with a condition desired by a photographer and comfortableness that allows a photographer to comfortably perform a rotation operation. As a method of supporting the operation ring, there has been known the structure that sandwiches the operation ring between two components, specifically, a base member configured to support rotation of the operation ring and a pressing member configured to press the operation ring so as to prevent shifting of the operation ring in an optical axis direction.

In Japanese Patent Application Laid-Open No. 2011-237595, there is a disclosure of a structure in which a pressing member (stopper ring) is fixed to a base member (lens barrel main body) with screws. Further, in Japanese Patent Application Laid-Open No. 2017-138449, there is a disclosure of a biasing structure (backlash removing biasing portion) for suppressing rotation of a bayonet structure which is used to prevent falling of a base member (fixed barrel) and a pressing member (holding ring) in an optical axis direction.

However, when the pressing member is fixed with only the screws as in Japanese Patent Application Laid-Open No. 2011-237595, there is a fear in that the base member is deformed due to fastening forces of the screws, and the operability of an operation ring is degraded. Further, in the configuration of Japanese Patent Application Laid-Open No. 2017-138449, there is a fear in that the pressing member comes off due to an excessive force applied to the pressing member by a user.

SUMMARY OF THE DISCLOSURE

The present disclosure has an object to provide an optical apparatus, which is easily disassembled and assembled, and is capable of suppressing degradation in operability of an operation ring, and an image pickup apparatus using the optical apparatus.

In order to achieve the above-mentioned object, according to the present disclosure, there is provided an optical apparatus, including: an optical element; a first member and a second member; an operation member, which is arranged between the first member and the second member, and is configured to be rotated to move the optical element; and a fixing member configured to fix the first member and the second member to each other, wherein at least one of the first member or the second member includes a stress absorbing portion configured to absorb stress generated by the fixing member.

It is possible to provide the optical apparatus, which is easily disassembled and assembled, and is capable of suppressing degradation in operability of the operation ring, and the image pickup apparatus using the optical apparatus.

Further features of the disclosure will become apparent from the following description of exemplary embodiments with reference to the attached drawings.

BRIEF DESCRIPTION OF THE DRAWINGS

FIG. 2 is a sectional view of the interchangeable lens 50 according to the embodiment of the disclosure in a state in which the overall length increases (WIDE).

DESCRIPTION OF THE EMBODIMENTS

Embodiment

Figure 1:
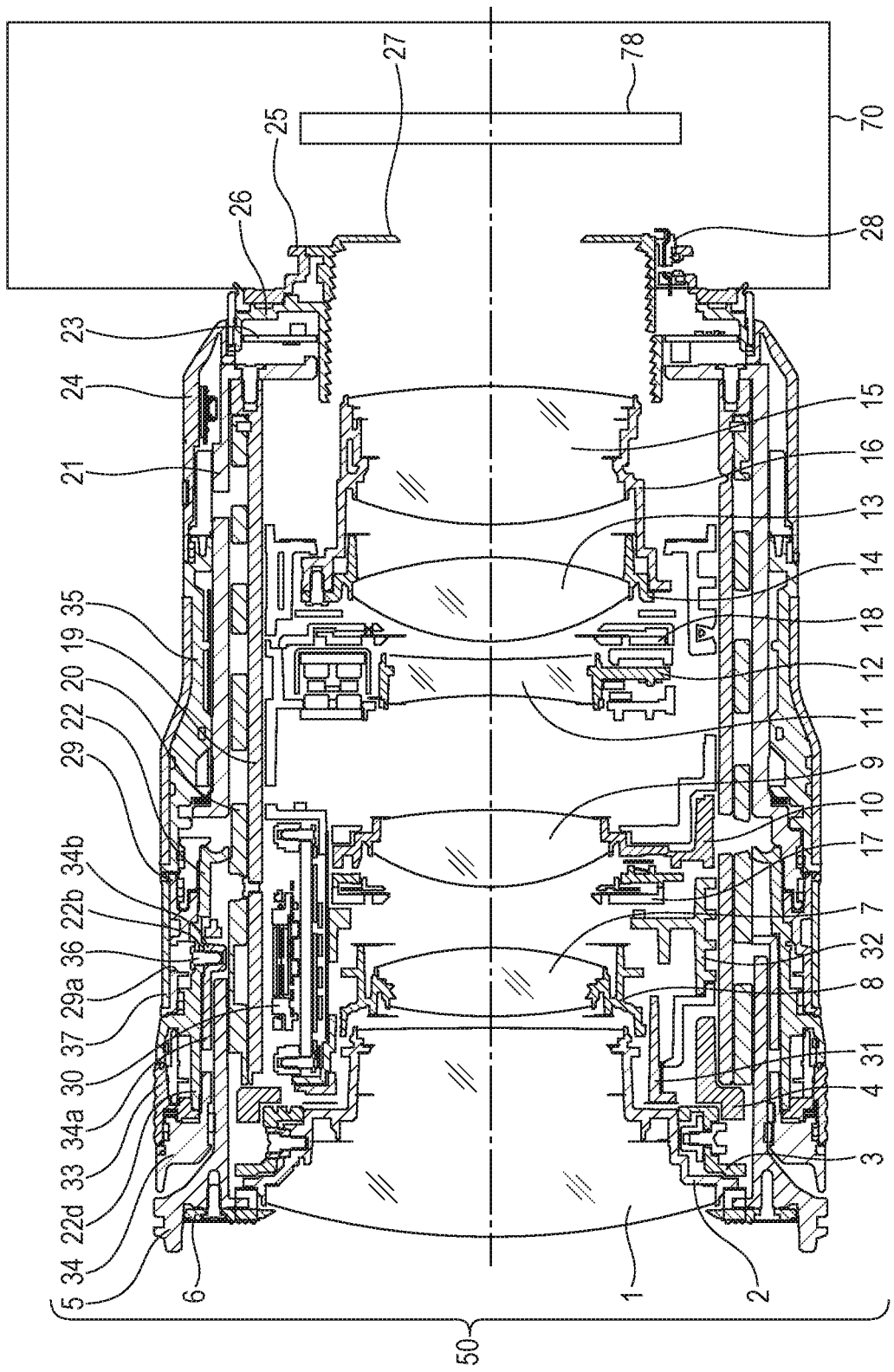
FIG. 1 is a sectional view of an interchangeable lens 50 according to an embodiment of the disclosure in a state in which an overall length decreases (TELE).

Exemplary embodiments of the disclosure will now be described in detail in accordance with the accompanying drawings. In an optical axis direction indicated by the one-dotted chain line in the drawings, an object side of an interchangeable lens 50 (optical apparatus) including an optical system formed of lenses being optical elements is defined as a front side, and a fixed side of the interchangeable lens 50 to be fixed to a camera main body 70 in a bayonet manner is defined as a rear side. The interchangeable lens 50 according to the embodiment of the present disclosure is described with reference to FIG. 1 and FIG. 2.

Figure 2:
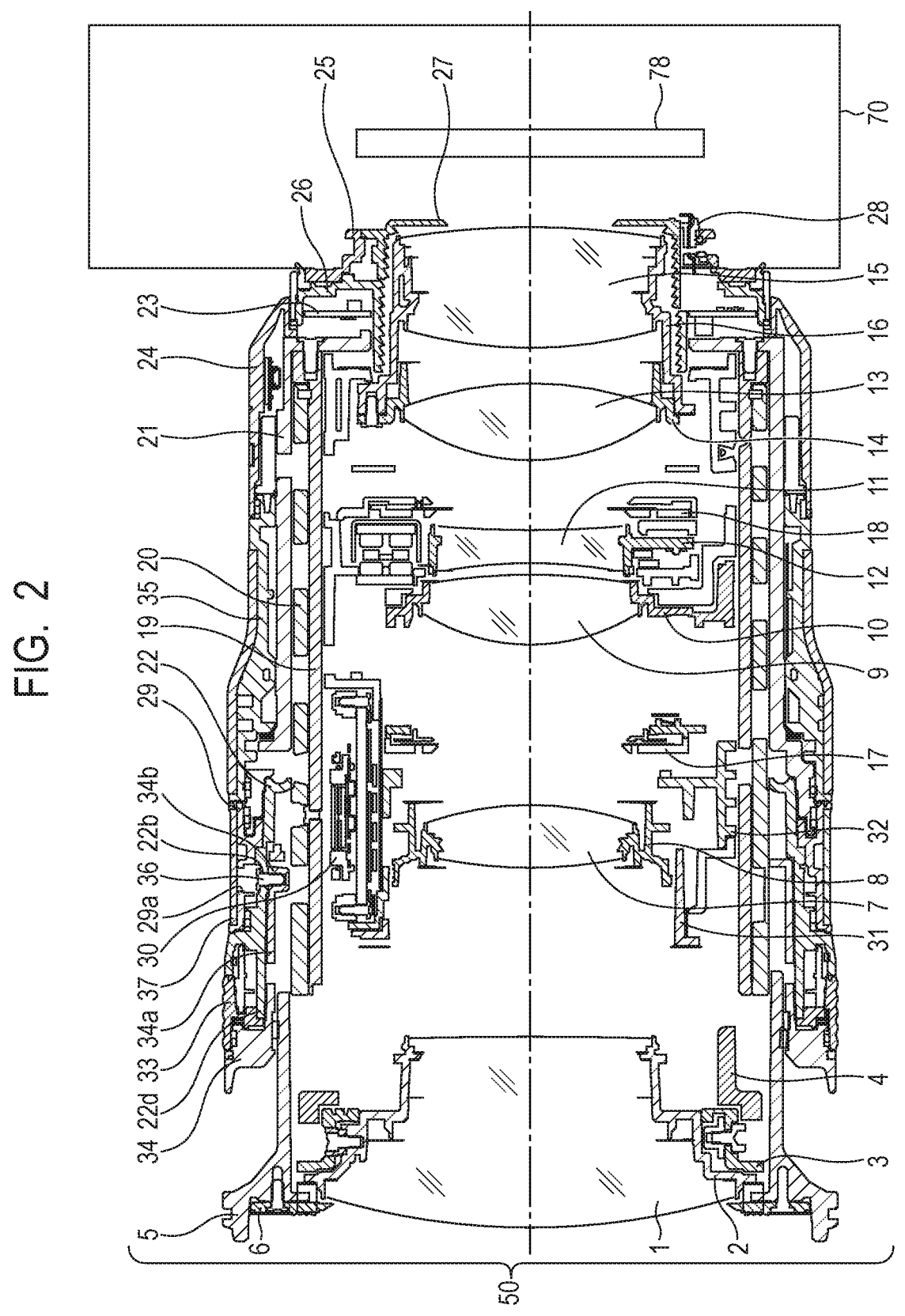

FIG. 1 is a sectional view of the interchangeable lens 50 in a state of TELE in which the overall length of the interchangeable lens 50 decreases. FIG. 2 is a sectional view of the interchangeable lens 50 in a state of WIDE in which the overall length of the interchangeable lens 50 increases. A first-unit lens 1 being an optical member is held by a first-unit lens barrel 2. The first-unit lens barrel 2 is held by a first-unit adjustment ring 3, and the first-unit adjustment ring 3 is configured to move the first-unit lens barrel 2 on a plane in an optical axis direction and a direction perpendicular to the optical axis direction for optical adjustment. The first-unit lens barrel 2 and the first-unit adjustment ring 3 are held by a first-unit base 4.

A straight-proceeding barrel 5 has a thread portion for mounting a filter (not shown) on an object side. The straight-proceeding barrel 5 and the first-unit lens 1 advance and retreat integrally with each other along with a zooming operation. However, in the embodiment, the straight-proceeding barrel 5 and the first-unit lens 1 are supported by different support structures (not shown) and moved. The specs and the like of the interchangeable lens 50 are printed on a decorative ring 6. The decorative ring 6 is fixed to the straight-proceeding barrel 5 with screws and forms an exterior appearance.

A second-unit lens 7 (focus lens) is held by a second-unit lens barrel 8. The second-unit lens barrel 8 is supported by a drive mechanism (ultrasonic motor unit 30) and a straight guide mechanism (not shown) such that the second-unit lens barrel 8 can advance and retreat along the optical axis direction. The second-unit lens barrel 8 is moved so that a focusing operation is performed. The straight guide mechanism uses two cylindrical members, which are so-called guide bars and extend in the optical axis direction. One of the two cylindrical members determines tilting/decentering of the second-unit lens barrel 8, and another one of the two cylindrical members determines a position of rotation about an optical axis. The second-unit lens barrel 8 is supported so as to be capable of advancing and retreating along the guide bars.

A third-unit lens 9 is held by a third-unit lens barrel 10. A fourth-unit lens 11 is held by a fourth-unit lens barrel 12. The fourth-unit lens barrel 12 moves the fourth-unit lens 11 on a plane perpendicular to the optical axis direction to achieve an optical image stabilization function of correcting so-called camera shake. An actuator used for exhibiting the optical image stabilization function is so-called a voice coil motor, and detailed description of the structure of the voice coil motor is omitted.

A fifth-unit lens 13 is held by a fifth-unit lens barrel 14. A sixth-unit lens 15 is held by a sixth-unit lens barrel 16. The fifth-unit lens barrel 14 is fixed to the sixth-unit lens barrel 16 with screws (not shown). Each lens unit described above may be formed of a plurality of lens units instead of being formed as one lens, and detailed description thereof is omitted for convenience of description.

An aperture unit 17 configured to adjust light intensity is fixed to the fourth-unit lens barrel 12, and includes a plurality of light blocking blades. The plurality of light blocking blades of the aperture unit 17 are driven by a stepping motor (not shown) as a drive source so that a desired F value can be obtained. The third-unit lens barrel 10 described above is movable in the optical axis direction while being sandwiched between the fourth-unit lens barrel 12 and the aperture unit 17 integrally fixed to the fourth-unit lens barrel 12.

An auxiliary aperture unit 18 configured to cut predetermined flare light is supported on the fourth-unit lens barrel 12, and includes a plurality of light blocking blades similarly to the aperture unit 17. The plurality of light blocking blades of the auxiliary aperture unit 18 are driven by a mechanical coupling mechanism (not shown) so that the plurality of light blocking blades can be changed to aperture states corresponding to zoom positions within the range of from TELE to WIDE.

The interchangeable lens 50 includes a guide barrel 19, and further includes a cam ring 20 rotatably engaged with an outer peripheral side of the guide barrel 19. The interchangeable lens 50 includes a front fixed barrel 22 (first member) provided on the object side and a rear fixed barrel 21 (third member) provided on the camera main body 70 side. The front fixed barrel 22 is fixed to a front side of the rear fixed barrel 21 with screws. The guide barrel 19, an exterior appearance barrel 24, a mount 25, and a printed circuit board 23 on which a driving IC for a lens, a microcomputer, and the like are arranged are further fixed to the rear fixed barrel 21.

A switch (not shown) that allows MF/AF switching or IS mode switching is arranged on an outer peripheral surface of the exterior appearance barrel 24 fixed to the rear fixed barrel 21 with screws. Further, a rear cover 27 is fixed to the mount 25 fixed to the rear fixed barrel 21 with screws, and light blocking lines that cut harmful light are arranged on an inner surface of the rear cover 27. A mount barrel 26 is fixed while being sandwiched between the rear fixed barrel 21 and the mount 25. Similarly to the rear cover 27, light blocking lines are arranged on an inner surface of the mount barrel 26. In the interchangeable lens 50 according to the embodiment, a focusing position to an image pickup unit 78 (image pickup element) can be adjusted by changing a thickness of the mount barrel 26 in the optical axis direction through processing or the like. A contact block 28 is connected to the printed circuit board 23 by wiring (flexible circuit board or the like) (not shown), and is fixed to the mount 25 with screws.

A focus operation ring 29 (outer member, second operation member) is arranged on a radially outer side of the front fixed barrel 22, and is supported so as to be rotatable at a fixed position about the front fixed barrel 22 as an axis. When the focus operation ring 29 is rotated, the rotation is detected by a sensor (not shown), and the second-unit lens barrel 8 is driven in accordance with the rotation amount so that focusing control of the second-unit lens 7 is performed.

The ultrasonic motor unit 30 is a drive source for the second-unit lens barrel 8, and moves by itself through ultrasonic vibration generated by a piezoelectric element. The second-unit lens barrel 8 and the ultrasonic motor unit 30 are engaged with each other by a coupling mechanism (not shown), and the second-unit lens barrel 8 is movable together with the ultrasonic motor unit 30. A light blocking wall (not shown) mounted to the second-unit lens barrel 8 switches light blocking/light transmitting of a photo interrupter (not shown). The light blocking/light transmitting is electrically detected, and an advancing and retreating position (reference position) of the second-unit lens barrel 8 is grasped based on the detection value. The second-unit lens barrel 8 is moved by a predetermined amount from the reference position so that the second-unit lens barrel 8 can be moved to a desired focusing position.

A first base 31 of the second-unit lens 7 holds one ends of the guide bars forming the above-mentioned straight guide mechanism. A second base 32 of the second-unit lens 7 holds another ends of the above-mentioned guide bars, the ultrasonic motor unit 30, and the photo interrupter. That is, the guide bars are fixed at a predetermined position while being sandwiched between the first base 31 and the second base 32.

A function operation ring 33 (operation member) is supported so as to be rotatable at a fixed position about the front fixed barrel 22 as an axis. After the function operation ring 33 is incorporated into a front cover 34 (second member), the front cover 34 is fixed to the front fixed barrel 22 with fixing screws 36 being fixing members as a presser for the function operation ring 33. A rotation amount of the function operation ring 33 is detected by a sensor (not shown) similarly to the focus operation ring 29. In the embodiment, the aperture unit 17 is controlled based on the detection value so that changing to any suitable F value is enabled. Changing of a photographing condition different from the F value, such as ISO sensitivity or shutter speed, can be assigned to the function operation ring 33.

An outer peripheral surface of the focus operation ring 29 has screw through holes 29a (assembly holes) for inserting the fixing screws 36. In the interchangeable lens 50 according to the embodiment, when the fixing screws 36 are to be fastened, the focus operation ring 29 is in a state of being already assembled. Therefore, the fixing screws 36 can be inserted into the screw through holes 29a formed in the focus operation ring 29. A method of assembling the front cover 34 is described later in detail.

A zoom operation ring 35 is rotatably supported on the rear fixed barrel 21. A wave washer (not shown) being a thrust biasing member is sandwiched between the zoom operation ring 35 and the rear fixed barrel 21 to form a thrust biasing structure configured to bias the zoom operation ring 35 in the optical axis direction. A PL cover washer (not shown) is arranged between the wave washer and a surface of the zoom operation ring 35.

The zoom operation ring 35 is made of a resin material and formed with a mold, and hence a parting line (hereinafter referred to as "PL") formed by molding is present in an inner peripheral surface of the zoom operation ring 35. The PL cover washer is arranged so as to prevent minute steps or burr formed in the PL from being brought into contact with the wave washer. The cam ring 20 and the zoom operation ring 35 are coupled to each other by a zoom key (not shown). When a user rotates the zoom operation ring 35, the cam ring 20 is rotated. The zoom operation ring 35 is determined in position in the optical axis direction (thrust position) with respect to the rear fixed barrel 21 through bayonet engagement (not shown) described later.

Next, a position adjustment mechanism (zoom operation) for each lens unit is described. Rollers (not shown) are arranged on each of the first-unit base 4 that holds the first-unit lens barrel 2 and the first-unit adjustment ring 3, the third-unit lens barrel 10, and the second base 32 of the second-unit lens 7 that holds the second-unit lens barrel 8 and the ultrasonic motor unit 30, and those rollers are engaged with the cam ring 20.

The actuator for exhibiting the optical image stabilization function and the auxiliary aperture unit 18 are mounted to the fourth-unit lens barrel 12 as described above, and further, the aperture unit 17 arranged on the front side with respect to the third-unit lens barrel 10 is mounted to the fourth-unit lens barrel 12. Rollers (not shown) are arranged on each of the fourth-unit lens barrel 12 and the sixth-unit lens barrel 16 that holds the fifth-unit lens barrel 14, and those rollers are engaged with the cam ring 20.

Those rollers are engaged with cam grooves (not shown) having different paths, which are formed in the cam ring 20. The cam grooves are formed to have paths that allow the lens units to be arranged at optically desired lens intervals at a desired zoom position. Along with rotation of the cam ring 20 about the optical axis, the first-unit base 4, the third-unit lens barrel 10, the fourth-unit lens barrel 12, the sixth-unit lens barrel 16, and the second base 32 can be arranged within the range of from the position of TELE in the contracted state illustrated in FIG. 1 to the position of WIDE in the extended state illustrated in FIG. 2 and at any suitable zoom position therebetween.

Rotation of the cam ring 20 is detected by a sensor (not shown). A zoom position corresponding to the rotation amount is determined by the IC mounted to the printed circuit board 23 based on a detected signal, and control of focus, image stabilization, and the stop in accordance with the zoom position is performed.

The interchangeable lens 50 according to the embodiment is fixed to the camera main body 70 being an image pickup apparatus with the mount 25 in a bayonet manner. When the interchangeable lens 50 is fixed to the camera main body 70 with the mount 25, the printed circuit board 23 configured to control an operation of each lens unit can communicate with the camera main body 70 via the contact block 28.

The image pickup unit 78 is mounted to the camera main body 70, and is a photoelectric conversion element (image pickup element) such as CMOS or CCD, which is configured to receive light having passed through the interchangeable lens 50 from an object and convert the light into an electric signal.

Figure 3:
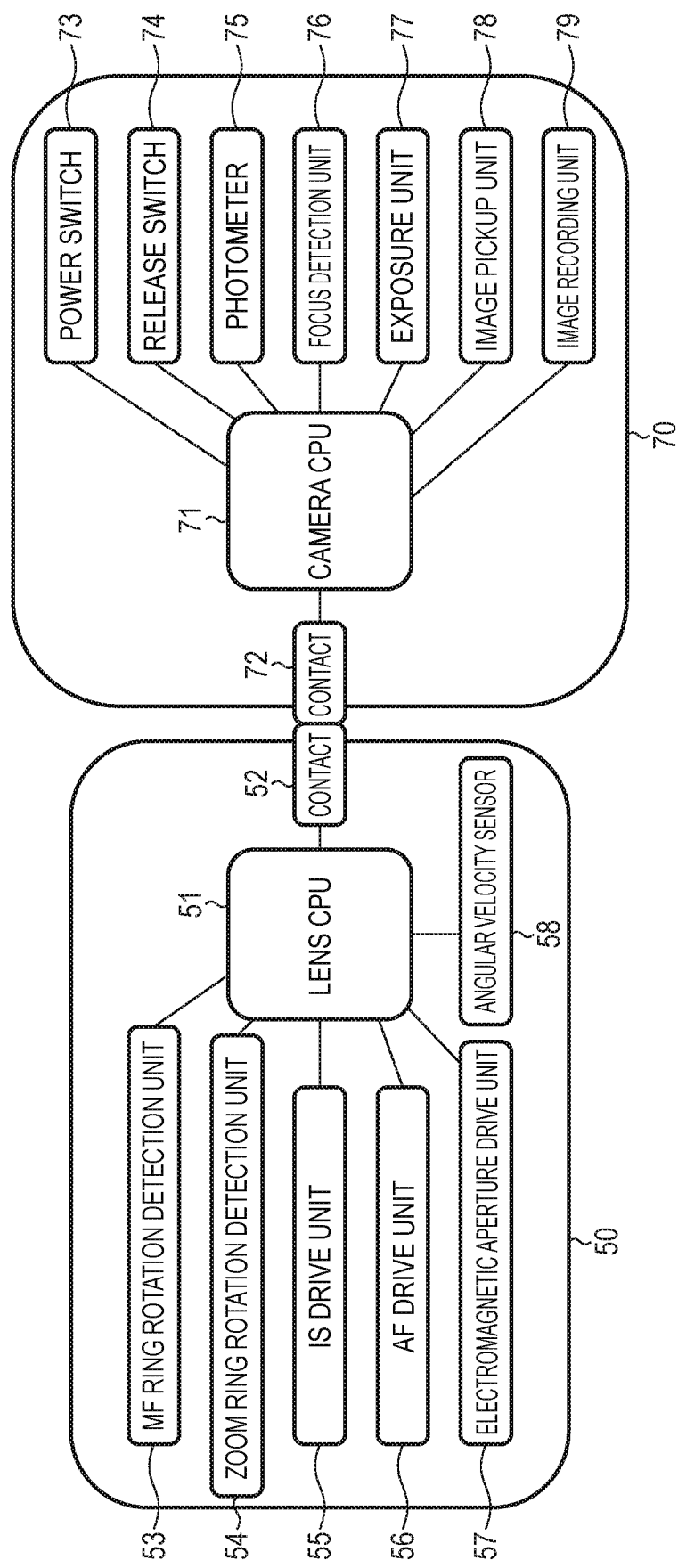
FIG. 3 is a system block diagram of the interchangeable lens 50 according to the embodiment and a camera main body 70.

FIG. 3 shows an electrical configuration of a camera system in the interchangeable lens 50 and the camera main body 70. First, a control flow in the camera main body 70 is described. A camera CPU 71 is formed of a microcomputer. The camera CPU 71 is configured to control an operation of each unit in the camera main body 70. Further, the camera CPU 71 communicates with a lens CPU 51 provided in the interchangeable lens 50 via a lens-side electric contact 52 and a camera-side electric contact 72 when the interchangeable lens 50 is mounted. Information (signal) transmitted by the camera CPU 71 to the lens CPU 51 includes drive amount information, parallel shake information, and focus shake information of the second-unit lens 7. Further, information (signal) transmitted from the lens CPU 51 to the camera CPU 71 includes image magnification information. The lens-side electric contact 52 and the camera-side electric contact 72 include contacts for supplying power from the camera main body 70 to the interchangeable lens 50.

A power switch 73 is a switch that is operable by a photographer, and can activate the camera CPU 71 and start power supply to each actuator and sensor in the camera system. A release switch 74 is a switch that is operable by a photographer, and includes a first stroke switch SW1 and a second stroke switch SW2. A signal from the release switch 74 is input to the camera CPU 71. The camera CPU 71 is brought into a photographing preparation state based on an input of an ON signal from the first stroke switch SW1. In the photographing preparation state, measurement of an object brightness by a photometer 75 and focus detection by a focus detection unit 76 are performed.

The camera CPU 71 is configured to compute a stop value of the aperture unit 17 and an exposure amount (shutter speed) of the image pickup element of the image pickup unit 78 based on the result of photometry by the photometer 75. Further, the camera CPU 71 is configured to determine drive amounts (including drive directions) of the second-unit lens 7 and the second-unit lens barrel 8 for obtaining a focused state with respect to an object based on focus information (defocus amount and defocus direction), which is a detection result of a focus state of a photographing optical system by the focus detection unit 76. The information of the drive amounts described above (drive amount information of the second-unit lens 7) is transmitted to the lens CPU 51. The lens CPU 51 is configured to control an operation of each component of the interchangeable lens 50.

Further, in a predetermined photographing mode, the camera CPU 71 starts control of shift drive of the second-unit lens barrel 8, that is, control of an image stabilization operation. When an ON signal from the second stroke switch SW2 is input, the camera CPU 71 transmits a stop drive command to the lens CPU 51 and sets the aperture unit 17 to the stop value computed in advance. Further, the camera CPU 71 transmits an exposure start command to the exposure unit 77 so that a retreating operation of a mirror (not shown) and an opening operation of a shutter (not shown) are performed, and causes the image pickup element of the image pickup unit 78 to perform photoelectric conversion of an object image, that is, an exposure operation.

An image pickup signal from the image pickup unit 78 is converted into a digital signal in a signal processing unit in the camera CPU 71, is further subjected to various correction processes, and is output as an image signal. The image signal (data) is recorded and stored in a recording medium such as a semiconductor memory such as a flash memory, a magnetic disk, or an optical disc in an image recording unit 79.

Next, a control flow in the interchangeable lens 50 is described. An MF ring rotation detection unit 53 is configured to detect rotation of the focus operation ring 29, and a ZOOM ring rotation detection unit 54 is configured to detect rotation of the zoom operation ring 35.

An IS drive unit 55 includes a drive actuator for the second-unit lens barrel 8 configured to perform an image stabilization operation, and a drive circuit of the drive actuator. An AF drive unit 56 performs AF drive of the second-unit lens barrel 8 via an AF motor (ultrasonic motor unit 30) in accordance with drive amount information of the second-unit lens 7 transmitted from the camera CPU 71.

An electromagnetic aperture drive unit 57 is controlled by the lens CPU 51 that receives a stop drive command from the camera CPU 71 to operate the aperture unit 17 into an aperture state corresponding to a designated stop value.

An angular velocity sensor 58 is mounted to the interchangeable lens 50, and is connected to the printed circuit board 23. The angular velocity sensor 58 is configured to detect angular velocities of vertical (pitch direction) shake and horizontal (yaw direction) shake which are angular shake of the camera system, and output the detection values to the lens CPU 51 as angular velocity signals. The lens CPU 51 is configured to electrically or mechanically integrate the angular velocity signals of the pitch direction and the yaw direction from the angular velocity sensor 58, and compute the pitch-direction shake amount and the yaw-direction shake amount which are displacement amounts in respective directions (those are collectively referred to as "angular shake amount").

The lens CPU 51 controls the IS drive unit 55 based on a synthesized displacement amount of the above-mentioned angular shake amount and parallel shake amount such that the second-unit lens barrel 8 is driven to be shifted to perform angular shake correction and parallel shake correction. Further, the lens CPU 51 controls the AF drive unit 56 based on a focus shake amount such that the second-unit lens barrel 8 is driven in the optical axis direction to perform focus shake correction.

Figure 4:
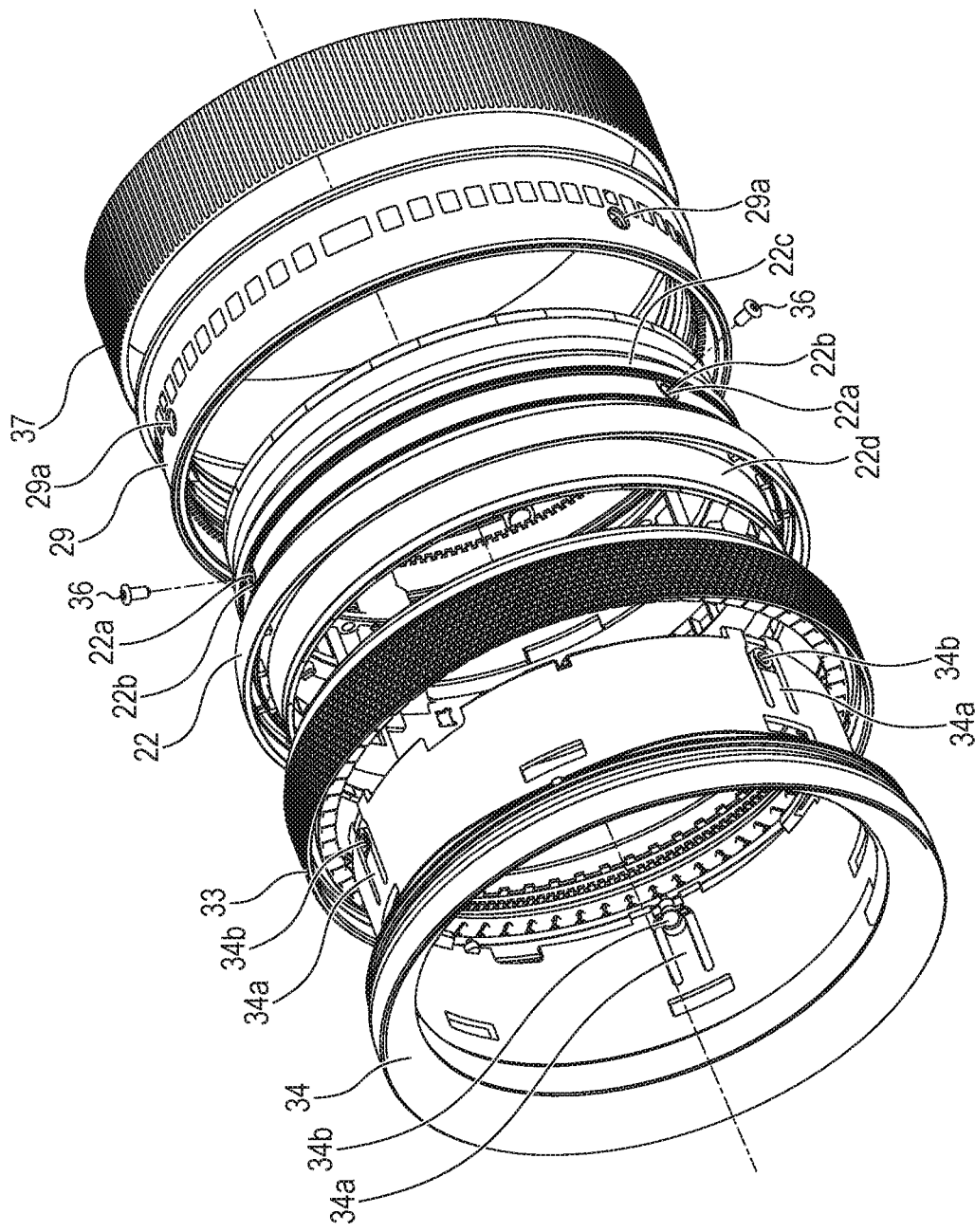
FIG. 4 is an exploded perspective view of a main part of the interchangeable lens 50 according to the embodiment.

Next, a method of assembling the focus operation ring 29 and the function operation ring 33 in the manufacture of the interchangeable lens 50 is described in the order of assembly with reference to FIG. 1, FIG. 2, and FIG. 4. FIG. 4 is an exploded perspective view of the interchangeable lens 50.

The focus operation ring 29 is incorporated between the rear fixed barrel 21 and the front fixed barrel 22 so as to be fitted to a first fitting shaft 22c formed in an outer peripheral surface of the front fixed barrel 22. That is, the focus operation ring 29 is sandwiched between the rear fixed barrel 21 and the front fixed barrel 22, and can be rotated at a fixed position about the first fitting shaft 22c as a rotation axis.

After the focus operation ring 29 is incorporated, the function operation ring 33 is incorporated so as to be fitted to a second fitting shaft 22d formed in the outer peripheral surface of the front fixed barrel 22. That is, the function operation ring 33 can be rotated at a fixed position about the second fitting shaft 22d as a rotation axis.

Next, the front cover 34 is arranged on an inner side of the front fixed barrel 22 along the optical axis direction. The front cover 34 is positioned with respect to the front fixed barrel 22 with a structure (not shown). In order to fix the front cover 34, the fixing screws 36 are inserted from the screw through holes 29a formed in the focus operation ring 29 into insertion holes 22a formed in the outer peripheral surface of the front fixed barrel 22. The fixing screws 36 thus inserted are threadedly engaged with coupling portions 34b formed in the front cover 34, and the fixing screws 36 are fastened to the coupling portions 34b under a state in which screw heads of the fixing screws 36 are brought into abutment against abutment surfaces 22b (abutment portions) formed on the outer peripheral surface of the front fixed barrel 22. In this state, the front cover 34 is fixed to the front fixed barrel 22.

An operation rubber 37 is placed on the focus operation ring 29 after the above-mentioned focus operation ring 29 and function operation ring 33 are incorporated. Although the focus operation ring 29 has the screw through holes 29a that allow insertion and passage of the fixing screws 36, the screw through holes 29a are covered by the operation rubber 37, and hence cannot be seen from the exterior appearance of the interchangeable lens 50. Even when a user touches the screw through hole 29a by a finger from above the operation rubber 37, there is no issue in performance of the interchangeable lens 50, and further, the screw through hole 29a often remains unnoticed. However, depending on a hole diameter of the screw through holes 29a, it is required to take a measure such as placing thin sheet members on the screw through holes 29a in some cases.

The front cover 34 has deformation beam portions 34a (deformation portions) that are deformable, and the coupling portions 34b are provided at distal ends in the optical axis direction being a longitudinal direction of the deformation beam portions 34a. The deformation beam portion 34a forms a stress absorbing portion. The deformation beam portion 34a has a cantilever shape under a state before the fixing screw 36 is fastened to the coupling portion 34b, and when the fixing screw 36 is fastened to the coupling portion 34b, the deformation beam portion 34a is elastically deformed by stress generated due to the fastening. The mechanism thereof is described below with reference to FIG. 5.

Figure 5:
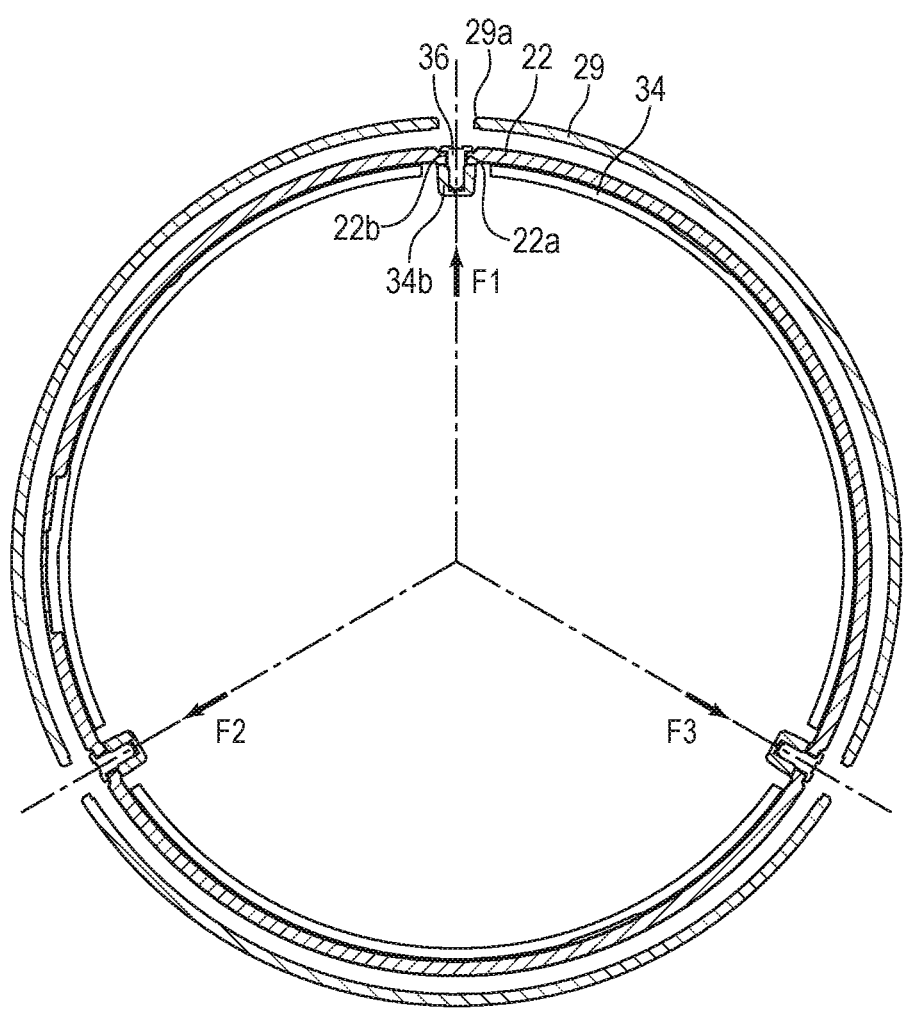
FIG. 5 is a sectional view of a part in which fixing screws 36 are fastened in the embodiment.

FIG. 5 is a sectional view of a plane orthogonal to the optical axis direction at a part in which the fixing screws 36 are fastened. FIG. 5 in the embodiment is drawn almost as in the designed value, and hence there is no clearance below the fixing screw 36 between the front fixed barrel 22 and the coupling portion 34b. However, as a matter of course, each component has a manufacturing error, and hence there may be a clearance between the front fixed barrel 22 and the coupling portion 34b in a state before the fixing screw 36 is fastened.

It is assumed that the fixing screw 36 is to be fastened in a configuration of including no deformation beam portion 34a. In this case, when, first, the fixing screw 36 is fastened at only one location, a fixing force F1 acts on the front cover 34 by the amount corresponding to the above-mentioned clearance, and the front fixed barrel 22 is pulled in a direction indicated by the arrow in FIG. 5. When the fixing screw 36 is fastened at a second location, a fixing force F2 acts, and when the fixing screw 36 is fastened at a third location, a fixing force F3 acts. The front fixed barrel 22 is pulled in the directions indicated by the arrows in FIG. 5, and the front fixed barrel 22 having a cylindrical shape is deformed to expand in three directions. When the front fixed barrel 22 is deformed, the first fitting shaft 22c and the second fitting shaft 22d are deformed. As a result, the operability of the focus operation ring 29 or the function operation ring 33 may be degraded.

However, in the embodiment, the front cover 34 has the deformation beam portions 34a. Therefore, stresses generated by the above-mentioned fixing forces F1 to F3 are absorbed by the deformation beam portions 34a being deformed, and deformation in the entire component of the front cover 34 and the front fixed barrel 22 having a cylindrical shape can be extremely reduced. That is, the deformation beam portions 34a can suppress deformation caused by the forces generated when the fixing screws 36 are fastened. Here, even when the fixing screw 36 is fastened at only one location, the first fitting shaft 22c and the second fitting shaft 22d may be deformed with a positioning portion of the front cover 34 and the front fixed barrel 22 serving as a fulcrum. Further, as the method of fixing the front cover 34 and the front fixed barrel 22, the fixing screws 36 are given as the embodiment. However, the front cover 34 and the front fixed barrel 22 may be fixed, for example, with a mold or a metal pin. Even by fixing with members other than the fixing screws 36, a force for deforming the front cover 34 and the front fixed barrel 22 may be generated.

Further, as described above, the assembly is performed such that the fixing screws 36 are inserted from the screw through holes 29a formed in the focus operation ring 29, that is, the outer side of the interchangeable lens 50. Therefore, an operation ring such as the function operation ring 33 can be removed without dismounting each lens unit and the like of the interchangeable lens 50. With such a structure of the aspect of the embodiments, maintenance work such as replenishment of grease or replacement or addition of components to the operation ring can be easily performed.

Figure 6A:
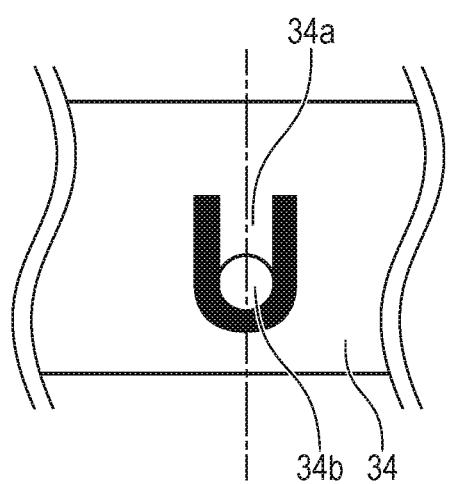
FIG. 6A is a developed view of an inner surface of a front cover in the embodiment.
Figure 6B:
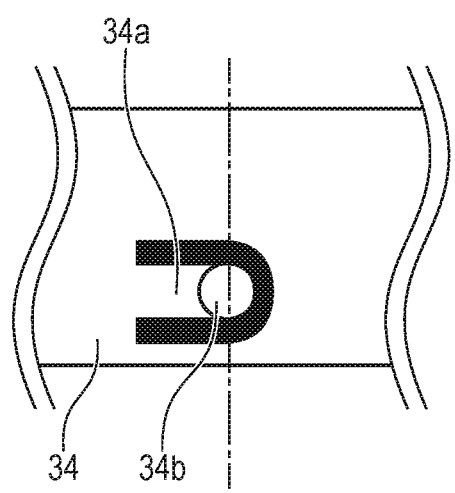
FIG. 6B is a developed view of the inner surface of the front cover in a modification example.

FIG. 6A is a developed view of an inner surface of the front cover 34, for illustrating arrangement of the deformation beam portion 34a in the embodiment. FIG. 6B is a developed view of the inner surface of the front cover 34, for illustrating a modification example of the arrangement of the deformation beam portion 34a. As illustrated in FIG. 6A, the deformation beam portion 34a has a cantilever shape in which the long sides extend along the optical axis direction. This arrangement is employed to prevent the deformation beam portion 34a from being caught on irregularities (not shown), which are formed on the inner surface of the front fixed barrel 22 due to, for example, a function of thinning for a mold. When so-called a bayonet structure is also employed in addition to the fixing screws 36 as a falling prevention measure for the front cover 34, the front cover 34 is relatively rotated and incorporated into the front fixed barrel 22. As a measure to prevent the deformation beam portions 34a from being caught on the above-mentioned irregularities in such a configuration, there may be employed a cantilever shape in which the long sides of the deformation beam portion 34a extend along the direction orthogonal to the optical axis direction (shape long in the circumferential direction of the front cover 34) as illustrated in FIG. 6B.

The exemplary embodiment of the present disclosure has been described above. However, the present disclosure is not limited to the embodiment and the modification example, and various changes and modifications may be made within the gist of the present disclosure. In this embodiment, the configuration is described on the premise of including the front fixed barrel 22 and the front cover 34, and the front cover 34 has the deformation beam portions 34a being the stress absorbing portions. However, the stress absorbing portions may be formed on the front fixed barrel 22. Further, the stress absorbing portions may be applied to the focus operation ring 29, the function operation ring 33, the zoom operation ring 35, and further an operation ring installed in the camera main body 70 and configured to switch the photographing condition. The material is not limited as long as the material is selected in consideration of the design function.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-157545, filed Aug. 30, 2019, which is hereby incorporated by reference herein in its entirety.

What is claimed is:

1. An optical apparatus comprising:
an optical element;
a first member and a second member;
an operation member, which is arranged between the first member and the second member, and is configured to be rotated to move the optical element; and
a fixing member configured to fix the first member and the second member to each other,
wherein at least one of the first member or the second member includes a stress absorbing portion configured to absorb stress generated by the fixing member.

2. The optical apparatus according to claim 1, wherein the stress absorbing portion includes a deformation portion that is deformable.

3. The optical apparatus according to claim 2, wherein the deformation portion has a cantilever shape in which a long side extends along one of an optical axis and a direction perpendicular to the optical axis.

4. The optical apparatus according to claim 1, wherein the stress absorbing portion has a coupling portion to be coupled to the fixing member.

5. The optical apparatus according to claim 4, wherein the fixing member is threadedly engaged with the coupling portion.

6. The optical apparatus according to claim 1, wherein the fixing member is configured to fix the first member and the second member to each other from an outer side as seen in an optical axis direction.

7. The optical apparatus according to claim 1,
wherein the first member has an abutment portion to be brought into abutment against the fixing member, and
wherein the optical apparatus further includes an outer member, which is arranged on a radially outer side of the first member, and has an assembly hole at a position overlapping with the abutment portion.

8. The optical apparatus according to claim 1 further comprising:
a third member; and
a second operation member, which is arranged between the second member and the third member, and is configured to be rotated to move the optical element.

9. The optical apparatus according to claim 1, wherein the optical apparatus is removably mounted to an image pickup apparatus.

10. An image pickup apparatus comprising:
an optical apparatus including:
an optical element;
a first member and a second member;

an operation member, which is arranged between the first member and the second member, and is configured to be rotated to move the optical element; and a fixing member configured to fix the first member and the second member to each other, at least one of the first member or the second member including a stress absorbing portion configured to absorb stress generated by the fixing member; and an image pickup element configured to receive light from the optical apparatus.

11. The image pickup apparatus according to claim 10, wherein the stress absorbing portion includes a deformation portion that is deformable.

12. The image pickup apparatus according to claim 11, wherein the deformation portion has a cantilever shape in which a long side extends along one of an optical axis and a direction perpendicular to the optical axis.

13. The image pickup apparatus according to claim 10, wherein the stress absorbing portion has a coupling portion to be coupled to the fixing member.

14. The image pickup apparatus according to claim 13, wherein the fixing member is threadedly engaged with the coupling portion.

15. The image pickup apparatus according to claim 10, wherein the fixing member is configured to fix the first member and the second member to each other from an outer side as seen in an optical axis direction.

16. The image pickup apparatus according to claim 10,
wherein the first member has an abutment portion to be brought into abutment against the fixing member, and
wherein the optical apparatus further includes an outer member, which is arranged on a radially outer side of the first member, and has an assembly hole at a position overlapping with the abutment portion.

17. The image pickup apparatus according to claim 10, wherein the optical apparatus further includes:
a third member; and
a second operation member, which is arranged between the second member and the third member, and is configured to be rotated to move the optical element.

18. The image pickup apparatus according to claim 10, wherein the optical apparatus is removably mounted to the image pickup apparatus.

19. An optical apparatus comprising:
an optical element;
a first member and a second member;
an operation member, which is arranged between the first member and the second member, and is configured to be rotated about an optical axis of the optical element; and a fixing member configured to fix the first member and the second member to each other,
wherein at least one of the first member or the second member includes a deformation portion that is deformable by a force generated when the fixing member fastens the first member and the second member.

20. The optical apparatus according to claim 19, wherein the deformation portion has a cantilever shape in which a long side extends along one of an optical axis and a direction perpendicular to the optical axis.

21. The optical apparatus according to claim 19, wherein the deformation portion has a coupling portion to be coupled to the fixing member.

22. The optical apparatus according to claim 21, wherein the fixing member is threadedly engaged with the coupling portion.

23. The optical apparatus according to claim 19, wherein the fixing member is configured to fix the first member and the second member to each other from an outer side as seen in an optical axis direction.

24. An image pickup apparatus comprising:
an optical apparatus including:
an optical element;
a first member and a second member;
an operation member, which is arranged between the first member and the second member, and is configured to be rotated about an optical axis of the optical element the optical element; and
a fixing member configured to fix the first member and the second member to each other,
at least one of the first member or the second member includes a deformation portion that is deformable by a force generated when the fixing member fastens the first member and the second member; and
an image pickup element configured to receive light from the optical apparatus.

25. The image pickup apparatus according to claim 24, wherein the deformation portion has a cantilever shape in which a long side extends along one of an optical axis and a direction perpendicular to the optical axis.

26. The image pickup apparatus according to claim 24, wherein the deformation portion has a coupling portion to be coupled to the fixing member.

27. The image pickup apparatus according to claim 26, wherein the fixing member is threadedly engaged with the coupling portion.

28. The image pickup apparatus according to claim 24, wherein the fixing member is configured to fix the first member and the second member to each other from an outer side as seen in an optical axis direction.

* * * * *